(12) United States Patent
Zang et al.

(10) Patent No.: US 11,978,995 B2
(45) Date of Patent: May 7, 2024

(54) LASER PULSE SEQUENCE ENERGY CORRECTION SYSTEM AND METHOD

(71) Applicant: Hefei Institutes of Physical Science, Chinese Academy of Sciences, Hefei (CN)

(72) Inventors: Qing Zang, Hefei (CN); Jian Zhou, Hefei (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 182 days.

(21) Appl. No.: 17/467,144

(22) Filed: Sep. 3, 2021

(65) Prior Publication Data

US 2021/0399515 A1  Dec. 23, 2021

(30) Foreign Application Priority Data

Dec. 14, 2020  (CN) .......................... 202011469179.7

(51) Int. Cl.
*H01S 3/00* (2006.01)
*H01S 3/13* (2006.01)

(52) U.S. Cl.
CPC .......... *H01S 3/0092* (2013.01); *H01S 3/1305* (2013.01); *H01S 3/1306* (2013.01)

(58) Field of Classification Search
CPC ........ H01S 3/1305; H01S 3/11; H01S 3/1306; H01S 3/0078; H01S 3/10069; H01S 3/117; H01S 3/10038; H01S 3/0092; H01S 3/005; H01S 3/0014; H01S 3/1312
See application file for complete search history.

(56) References Cited

U.S. PATENT DOCUMENTS

| | | | |
|---|---|---|---|
| 2005/0201423 A1* | 9/2005 | Lai | H01S 3/10 372/9 |
| 2008/0013163 A1* | 1/2008 | Leonardo | G02F 1/353 359/341.1 |
| 2008/0291951 A1* | 11/2008 | Konttinen | H04N 9/3164 372/21 |

(Continued)

FOREIGN PATENT DOCUMENTS

| | | |
|---|---|---|
| CN | 101849332 A | 9/2010 |
| CN | 104682185 A | 6/2015 |
| CN | 105305214 A | 2/2016 |

*Primary Examiner* — Xinning(Tom) Niu

(57) ABSTRACT

The present disclosure provides a laser pulse sequence energy correction system and method. The correction system includes a fundamental frequency light source, a control unit, an energy adjusting unit and a frequency multiplication crystal; the fundamental frequency light source is configured to output a fundamental frequency pulse laser, and the frequency multiplication crystal is configured to convert the fundamental frequency pulse laser into a multiple frequency pulse laser; the control unit prestores an energy-time curve of the multiple frequency pulse laser, and the control unit is configured to control the energy adjusting unit to adjust the intensity of the fundamental frequency pulse laser incident on the frequency multiplication crystal according to the energy-time curve, so that energy of each pulse in the multiple frequency pulse laser is identical. The technical solution of the present disclosure has advantages of simple structure, reliable device, convenient adjustment and the like.

12 Claims, 3 Drawing Sheets

(56) References Cited

U.S. PATENT DOCUMENTS

| | | | |
|---|---|---|---|
| 2009/0097512 A1* | 4/2009 | Clowes | H01S 3/0092 372/21 |
| 2009/0290609 A1* | 11/2009 | Inoue | H01S 5/042 372/38.02 |
| 2010/0177794 A1* | 7/2010 | Peng | H01S 3/2316 372/25 |
| 2017/0187160 A1* | 6/2017 | Lowder | H01S 3/10038 |
| 2018/0337508 A1* | 11/2018 | Liu | G01J 3/0237 |

* cited by examiner

LASER PULSE SEQUENCE ENERGY CORRECTION SYSTEM AND METHOD

CROSS REFERENCE TO THE RELATED APPLICATION

This application is based upon and claims the priority of the Chinese patent application filed on Dec. 14, 2020, with the application number of CN202011469179.7, the entire contents of which are incorporated herein by reference.

FIELD OF TECHNOLOGY

The embodiments of the present disclosure relate to a laser technology, and particularly relate to a laser pulse sequence energy correction system and method.

BACKGROUND

Due to high single pulse energy, a common low PRF (50 Hz or below) solid laser has been widely applied to the fields of medical treatment, scientific research, industry and the like. at present. With the development of science and technology, the number of users, who have higher requirements on repetition frequency and a wavelength of a laser, is increasing, and laser products with multi-wavelength and high repetition frequency output are increasingly abundant.

An existing multi-wavelength and high-repetition-frequency laser has a problem that fundamental frequency light may heat a frequency multiplication crystal due to high repetition frequency, so that frequency multiplication efficiency of the frequency multiplication crystal in a cold state and frequency multiplication efficiency of the frequency multiplication crystal in a hot state are different, frequency multiplication energy at the start of output and in a stable state is different, an energy curve slowly rises or falls to a stable state, causing the nonuniform intensity of an output pulse train.

SUMMARY

The embodiments of the present disclosure provide a laser pulse sequence energy correction system and method, so as to realize the identical intensity of each pulse in output pulses, having advantages of simple structure, reliable device, convenient adjustment and the like.

In a first aspect, the embodiments of the present disclosure provide a laser pulse sequence energy correction system, which includes a fundamental frequency light source, a control unit, an energy adjusting unit and a frequency multiplication crystal;

the fundamental frequency light source is configured to output a fundamental frequency pulse laser, and the frequency multiplication crystal is configured to convert the fundamental frequency pulse laser into a multiple frequency pulse laser;

the energy adjusting unit is located between the fundamental frequency light source and the frequency multiplication crystal;

the control unit is connected to the energy adjusting unit, the control unit prestores an energy-time curve of the multiple frequency pulse laser, and the control unit is configured to control the energy adjusting unit to adjust the intensity of the fundamental frequency pulse laser incident on the frequency multiplication crystal according to the energy-time curve, so that energy of each pulse in the multiple frequency pulse laser is identical;

wherein the energy-time curve is obtained when the energy adjusting unit is not in operation.

Optionally, the system further includes a light splitting unit, the light splitting unit is arranged at an emitting end of the frequency multiplication crystal, a first output end of the light splitting unit emits a multiple frequency pulse laser, and a second output end of the light splitting unit emits a fundamental frequency pulse laser.

Optionally, the light splitting unit includes a light splitting mirror, wherein the light splitting mirror is configured to transmit the multiple frequency pulse laser and reflect the fundamental frequency pulse laser, or the light splitting mirror is configured to reflect the multiple frequency pulse laser and transmit the fundamental frequency pulse laser.

Optionally, the light splitting mirror is a dichroic mirror.

Optionally, the system further includes a fundamental frequency pulse laser absorption unit, which is configured to absorb the fundamental frequency pulse laser output by the light splitting unit.

Optionally, pulse widths of the fundamental frequency pulse laser and the multiple frequency pulse laser are on the order of nanoseconds.

Optionally, the energy adjusting unit includes a half wave plate and a rotating mechanism, and the rotating mechanism drives the half wave plate to rotate to adjust the intensity of the fundamental frequency pulse laser.

Optionally, pulse widths of the fundamental frequency pulse laser and the multiple frequency pulse laser are on the order of picoseconds.

Optionally, the energy adjusting unit includes an acoustic-optic modulator or an acoustic-optic Q switch.

In a second aspect, the embodiments of the present disclosure further provide a laser pulse sequence energy correction method by using the above laser pulse sequence energy correction system. The method includes:

outputting a fundamental frequency pulse laser produced by a fundamental frequency light source to a frequency multiplication crystal, and acquiring output energy of the frequency multiplication crystal when an energy adjusting unit is not in operation, so as to obtain an energy-time curve of a multiple frequency pulse laser;

obtaining a time period T from the start of light emitting to time when frequency multiplication energy becomes stable according to the energy-time curve; and operating the energy adjusting unit between the fundamental frequency light source and the frequency multiplication crystal, controlling, by a control unit, the energy adjusting unit to adjust the intensity of the fundamental frequency pulse laser incident on the frequency multiplication crystal in a time period T according to the energy-time curve, so as to enable energy of each pulse in the multiple frequency pulse laser to be identical.

Beneficial Effects

The laser pulse sequence energy correction system provided by the embodiments of the present disclosure includes a fundamental frequency light source, a control unit, an energy adjusting unit and a frequency multiplication crystal; the fundamental frequency light source outputs the fundamental frequency pulse laser, and the frequency multiplication crystal converts the fundamental frequency pulse laser into the multiple frequency pulse laser; the control unit prestores the energy-time curve of the multiple frequency pulse laser when the energy adjusting unit is not in operation, the time period from the start of light emitting to the time when the frequency multiplication energy becomes stable is obtained, and in the time period, the control unit controls the energy adjusting unit to adjust the intensity of the fundamental frequency pulse laser incident on the frequency multiplication crystal according to the energy-time curve, so that energy of each pulse in the multiple frequency pulse laser is identical, a problem of the inconsistent intensity of the multiple frequency pulse laser in the prior art is solved, and the laser pulse sequence energy correction system has the advantages of simple structure, reliable device, convenient adjustment and the like.

DESCRIPTION OF THE EMBODIMENTS

Figure 1:
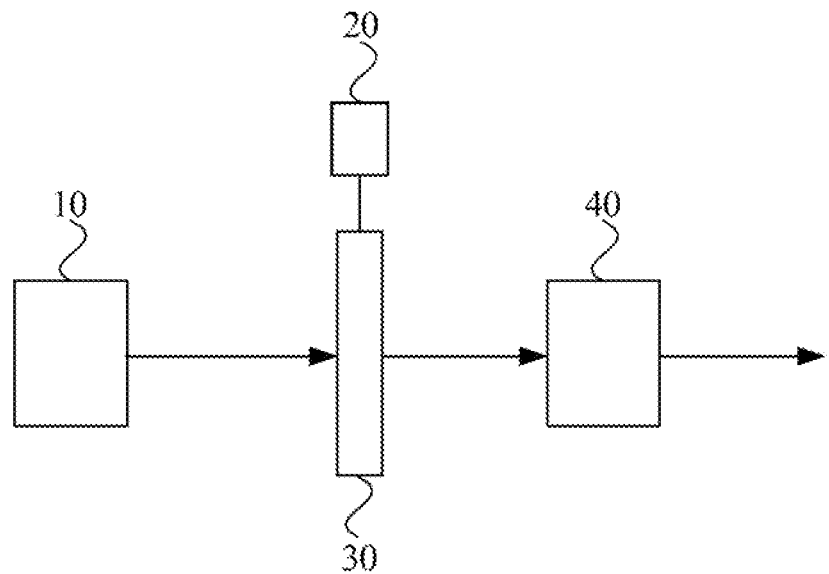
FIG. 1 is a structural schematic diagram of a laser pulse sequence energy correction system provided by embodiments of the present disclosure.

The present disclosure is further described in detail with reference to the drawings and the specific embodiments below. It should be understood that the specific embodiments described herein are only used to explain the present disclosure, not to limit the present disclosure. In addition, it should be noted that for convenience of description, only some structures related to the present disclosure are shown in the drawings, but not all structures.

The terms used in the embodiments of the present disclosure are merely for describing the specific embodiments and are not intended to limit the present disclosure. It should be noted that the locative words such as "up", "down", "left" and "right" described in the embodiments of the present disclosure are described from the angles shown in the drawings, and should not be understood as limiting the embodiments of the present disclosure. In addition, herein, it should be understood that when an element is mentioned to be formed "on" or "under" another element, it can not only be directly formed "on" or "under" another element, but also be indirectly formed "on" or "under" another element by means of an intermediate element. The terms "first", "second" and the like are only used for descriptive purposes, and do not indicate any order, quantity or importance, but are only used to distinguish different components. Those of ordinary skill in the art may understand specific meanings of the above terms in the present disclosure according to specific circumstance.

FIG. 1 shows a structural schematic diagram of a laser pulse sequence energy correction system provided by embodiments of the present disclosure. With reference to FIG. 1, the laser pulse sequence energy correction system provided by the embodiment includes a fundamental frequency light source 10, a control unit 20, an energy adjusting unit 30 and a frequency multiplication crystal 40; the fundamental frequency light source 10 is configured to output a fundamental frequency pulse laser, and the frequency multiplication crystal 40 is configured to convert the fundamental frequency pulse laser into a multiple frequency pulse laser; the energy adjusting unit 30 is located between the fundamental frequency light source 10 and the frequency multiplication crystal 40; and the control unit 20 is connected to the energy adjusting unit 30, the control unit 20 prestores an energy-time curve of the multiple frequency pulse laser, and the control unit 20 is configured to control the energy adjusting unit 30 to adjust the intensity of the fundamental frequency pulse laser incident on the frequency multiplication crystal 40 according to the energy-time curve, so that energy of each pulse in the multiple frequency pulse laser is identical, wherein the energy-time curve is obtained when the energy adjusting unit 30 is not in operation.

The fundamental frequency light source 10 is capable of emitting fundamental frequency light, and the fundamental frequency light is a pulse train. The frequency multiplication crystal 40 converts the fundamental frequency light into the multiple frequency light, such as double frequency, triple frequency, and the like by means of a nonlinear effect, which is not limited by the embodiments of the present disclosure. In some embodiments, the fundamental frequency light source 10 is a semiconductor laser, a solid-state laser, a fiber laser and the like, for example, the fundamental frequency light source 10 is an Nd of 1064 nm: a YAG laser, and in some embodiments, the frequency multiplication crystal 40 is a barium metaborate (BBO) crystal, wherein during specific implementation, types of the fundamental frequency light source 10 and the frequency multiplication crystal 40 are selected according to actual application requirements. Under control of the control unit 20, the energy adjusting unit 30 adjusts the intensity of the fundamental frequency pulse laser input to the frequency multiplication crystal 40 according to different program settings and a preset rule.

Figure 2:
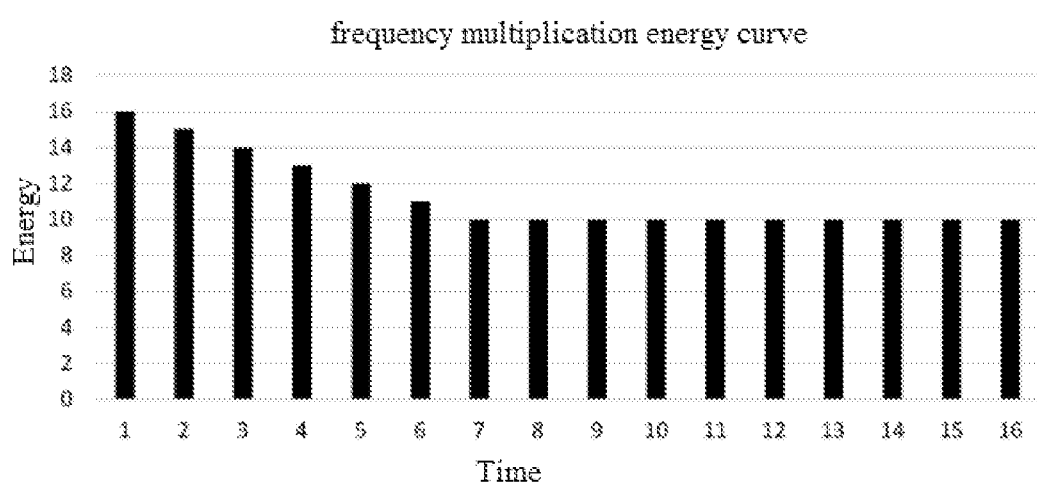
FIG. 2 is a schematic diagram of an energy-time curve provided by the embodiments of the present disclosure.

When the laser pulse sequence energy correction system is in operation, the frequency multiplication crystal 40 has different efficiency at different temperatures because of a heating effect of the fundamental frequency pulse laser on the frequency multiplication crystal 40, and if power of the fundamental frequency pulse laser is constant, the emitted multiple frequency pulse laser generally rises slowly or falls slowly to a stable state, for example, it rises to the stable state exponentially or falls to the stable state exponentially. For example, FIG. 2 shows a schematic diagram of an energy-time curve provided by the embodiments of the present disclosure. With reference to FIG. 2, a vertical axis represents energy of each pulse, a horizontal axis represents a pulse train, and a pulse interval is a pulse period (which can be converted into frequency). When the energy adjusting unit 30 is not in operation, no energy correction is conducted, and after a series of pulses are frequency-multiplied, the crystal temperature gradually rises due to a heating effect of fundamental frequency light on the crystal, while the energy of each pulse in the pulse train gradually decreases and reaches a stable state.

Figure 3:
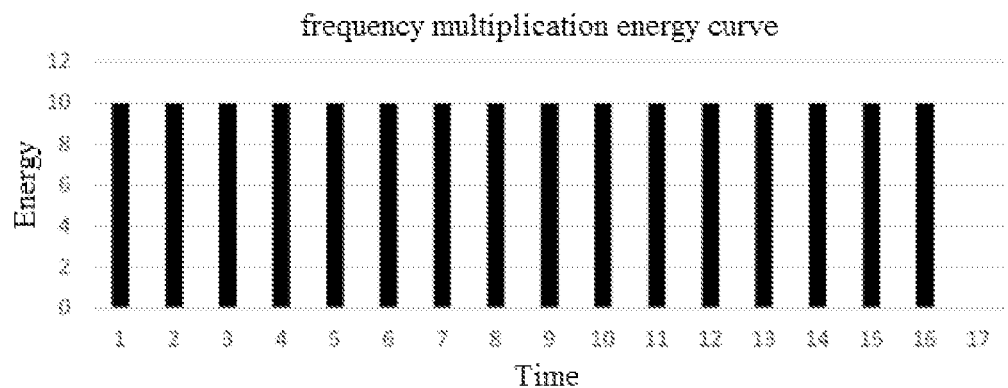
FIG. 3 is a schematic diagram of a frequency multiplication energy curve after adjustment provided by the embodiments of the present disclosure.

In the embodiment, the intensity of the fundamental frequency pulse laser is adjusted by the energy adjusting unit 30 to change according to an opposite rule before stabilization, so that the frequency multiplication output energy curve can be smooth without slow rise or fall. Specifically, when the energy adjusting unit 30 is not in operation, the fundamental frequency light source 10 is controlled to turn on, the energy-time curve output by the frequency multiplication crystal 40 is calibrated, a time period T from the start of light emitting to time when frequency multiplication energy becomes stable is acquired, the energy-time curve is prestored in the control unit 20, and the control unit 20 controls the intensity of the fundamental frequency pulse laser to change in the time period T according to the energy-time curve, so that the energy of each pulse output by the frequency multiplication crystal 40 is identical. FIG. 3 shows a schematic diagram of a frequency multiplication energy curve after adjustment provided by the embodiments of the present disclosure. With reference to FIG. 3, by controlling the energy adjusting unit, frequency multiplication efficiency of several first pulses is suppressed, which is basically consistent with pulse energy after the temperature of the frequency multiplication crystal becomes stable, thus realizing stable output of energy of the frequency multiplication crystal.

According to the technical solution of the embodiment, the fundamental frequency light source outputs the fundamental frequency pulse laser, and the frequency multiplication crystal converts the fundamental frequency pulse laser into the multiple frequency pulse laser; the control unit prestores the energy-time curve of the multiple frequency pulse laser when the energy adjusting unit is not in operation, the time period from the start of light emitting to the time when the frequency multiplication energy becomes stable is obtained, and in the time period, the control unit controls the energy adjusting unit to adjust the intensity of the fundamental frequency pulse laser incident on the frequency multiplication crystal according to the energy-time curve, so that the energy of each pulse in the multiple frequency pulse laser is identical, a problem of the inconsistent intensity of the multiple frequency pulse laser in the prior art is solved, and the laser pulse sequence energy correction system has the advantages of simple structure, reliable device, convenient adjustment and the like.

Figure 4:
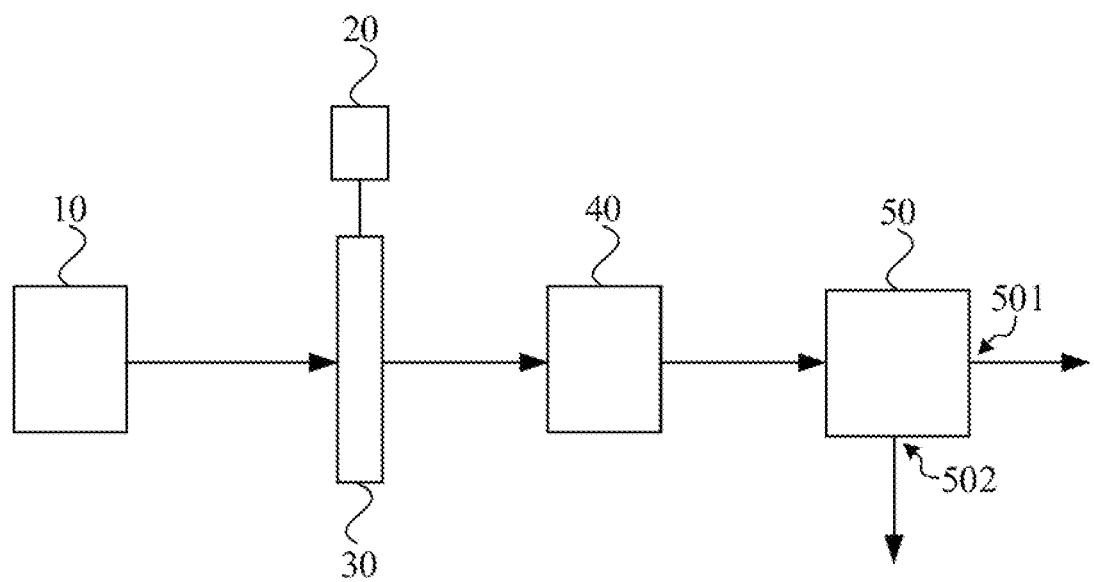
FIG. 4 is a structural schematic diagram of another laser pulse sequence energy correction system provided by the embodiments of the present disclosure.

On the basis of the above technical solution, FIG. 4 shows a structural schematic diagram of another laser pulse sequence energy correction system provided by the embodiments of the present disclosure. With reference to FIG. 4, optionally, the laser pulse sequence energy correction system provided by the embodiment further includes a light splitting unit 50, the light splitting unit 50 is arranged at an emitting end of the frequency multiplication crystal 40, a first output end 501 of the light splitting unit 50 emits a multiple frequency pulse laser, and a second output end 502 of the light splitting unit 50 emits a fundamental frequency pulse laser.

It should be understood that since efficiency of the frequency multiplication crystal 40 cannot reach 100%, a beam output by the frequency multiplication crystal 40 may also include fundamental frequency light, and in some applications, it may be undesirable to have the fundamental frequency light in the beam, so the light splitting unit 50 is arranged to filter out the fundamental frequency light. During specific implementation, the first output end can be a transmitting end or a reflecting end, and optionally, the light splitting unit 50 includes a light splitting mirror, wherein the light splitting mirror is configured to transmit the multiple frequency pulse laser and reflect the fundamental frequency pulse laser, or the light splitting mirror is configured to reflect the multiple frequency pulse laser and transmit the fundamental frequency pulse laser, which is not limited by the embodiments of the present disclosure. Optionally, the light splitting mirror may be a dichroic mirror.

Figure 5:
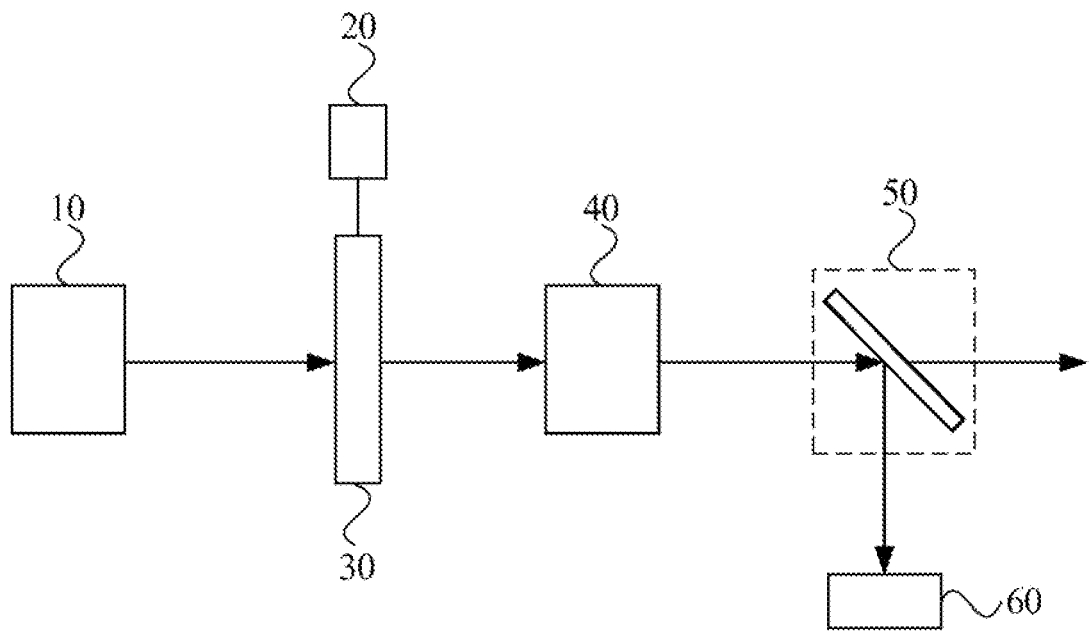
FIG. 5 is a structural schematic diagram of another laser pulse sequence energy correction system provided by the embodiments of the present disclosure.

FIG. 5 shows a structural schematic diagram of another laser pulse sequence energy correction system provided by the embodiments of the present disclosure. With reference to FIG. 5, optionally, the laser pulse sequence energy correction system provided by the embodiment further includes a fundamental frequency pulse laser absorption unit 60, configured to absorb the fundamental frequency pulse laser output by the light splitting unit 50.

It should be understood that in the laser pulse sequence energy correction system shown in FIG. 5, it is only schematic that a reflecting end of the light splitting unit 50 outputs the fundamental frequency pulse laser, and in other embodiments, if a transmitting end of the light splitting unit 50 outputs the fundamental frequency pulse laser, it is only necessary to set the fundamental frequency pulse laser absorption unit 60 at the transmitting end of the light splitting unit 50.

Optionally, pulse widths of the fundamental frequency pulse laser and the multiple frequency pulse laser are on the order of nanoseconds. Optionally, the energy adjusting unit includes a half wave plate and a rotating mechanism, and the rotating mechanism drives the half wave plate to rotate to adjust the intensity of the fundamental frequency pulse laser.

For example, in at least one embodiment, the rotating mechanism is an energy rotary table, the half wave plate is installed on the energy rotary table, and the frequency multiplication crystal is a double-frequency crystal. A fundamental frequency light source uses a fundamental frequency pulse train with energy of 6 J, 10 ms and containing 50 sub-pulses for frequency multiplication, hoping to finally obtain multiple frequency light with total energy of 3 J and identical energy of each sub-pulse. Through detection, after frequency multiplication, output energy of a single sub-pulse decays from 65 mJ to 60 mJ (from a first pulse to a twentieth pulse) and stabilizes, while the energy rotary table rotates about 0.5° (from 0° to 0.5°) to adjust the energy from 65 mJ to 60 mJ. Then, when fundamental frequency light starts to work, a rotary table angle is set as 0.5°, at which time the multiple frequency light of a single pulse outputs 60 mJ energy, and the rotary table rotates from 0.5° to 0° within 4 ms, so that it is ensured that the output energy of the single pulse of the multiple frequency light is always 60 mJ within 10 ms, and then the multiple frequency light with the total energy of 3 J and the equal energy of each single pulse is obtained.

Optionally, pulse widths of the fundamental frequency pulse laser and the multiple frequency pulse laser are on the order of picoseconds. Optionally, the energy adjusting unit includes an acoustic-optic modulator or an acoustic-optic Q switch.

The embodiment is suitable for a laser with repetition frequency of 1 kHz or above. For example, in another embodiment, the energy adjusting unit is an acoustic-optic modulator (AOM) or an acoustic-optic Q switch, and the frequency multiplication crystal is a double-frequency crystal. The fundamental frequency light source uses a picosecond 1064 nm laser with repetition frequency of 200 kHz and power of 30 W for frequency multiplication, hoping to obtain the multiple frequency light with output power of 15 W and basically equal energy of each pulse. It is found after detection that after frequency multiplication, single pulse energy decreases from 0.08 µJ to 0.075 µJ within 1 s, and by controlling the radio frequency intensity of the AOM, the intensity of the incident fundamental frequency light increases from about 28 W to 30 W within 1 s, so that the multiple frequency light keeps the single pulse energy of 0.075 µJ, and finally the multiple frequency light with average power of 15 W and basically equal energy of each pulse is obtained.

Figure 6:
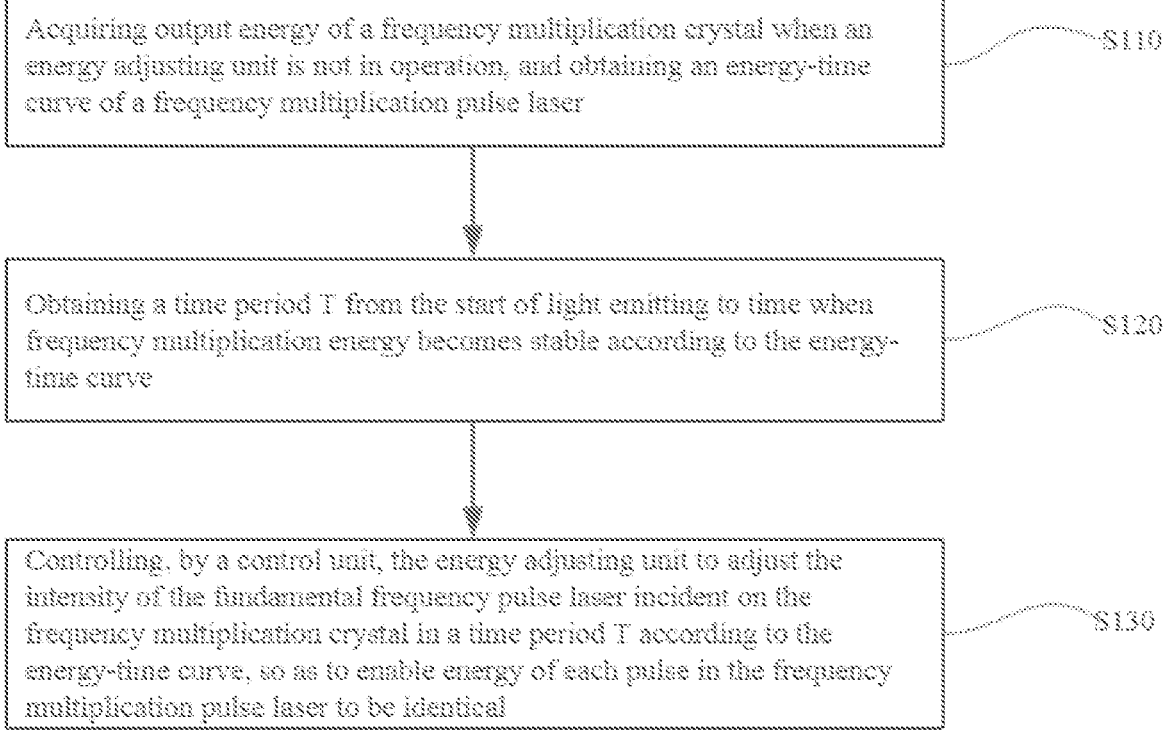
FIG. 6 is a flow schematic diagram of a laser pulse sequence energy correction method provided by the embodiments of the present disclosure.

FIG. 6 shows a flow schematic diagram of a laser pulse sequence energy correction method provided by the embodiments of the present disclosure, and the method can be implemented by any laser pulse sequence energy correction system provided by the above embodiments. The laser pulse sequence energy correction method includes the steps as follows:

S110, output energy of a frequency multiplication crystal when an energy adjusting unit is not in operation is acquired so as to obtain an energy-time curve of a multiple frequency pulse laser.

The step that the output energy of the frequency multiplication crystal when the energy adjusting unit is not in operation is acquired means that the energy adjusting unit is closed, a fundamental frequency light source is controlled to turn on, and the energy-time curve output by the frequency multiplication crystal is calibrated to obtain an energy-time correspondence similar to that shown in FIG. 2.

S120, a time period T from the start of light emitting to time when frequency multiplication energy becomes stable is obtained according to the energy-time curve.

For example, with reference to FIG. 2, energy of each pulse after a seventh pulse is stable, that is, a time period corresponding to first six pulses is T.

S130, a control unit controls the energy adjusting unit to adjust the intensity of a fundamental frequency pulse laser incident on the frequency multiplication crystal in a time period T according to the energy-time curve, so as to enable the energy of each pulse in the multiple frequency pulse laser to be identical.

In the time period T, according to an opposite change rule of the energy-time curve, change of the fundamental frequency pulse laser is controlled, so as to enable the energy of each pulse in the multiple frequency pulse laser to be identical. For example, if the energy of each pulse in the multiple frequency pulse laser gradually decreases in the time period T, the control unit controls the energy adjusting unit to enable energy of a laser pulse incident on the frequency multiplication crystal to gradually increase, so that energy of each frequency multiplication pulse output by the frequency multiplication crystal always remains stable or identical.

According to the technical solution of the embodiment, the energy-time curve of the multiple frequency pulse laser is acquired when the energy adjusting unit is not in operation, the time period from the start of light emitting to the time when the frequency multiplication energy becomes stable is obtained, and in the time period, the control unit controls the energy adjusting unit to adjust the intensity of the fundamental frequency pulse laser incident on the frequency multiplication crystal according to the energy-time curve, so that the energy of each pulse in the multiple frequency pulse laser is identical, a problem of the inconsistent intensity of the multiple frequency pulse laser in the prior art is solved.

Please note that the above description is only exemplary embodiments of the present disclosure and an applied technical principle. Those skilled in the art may understand that the present disclosure is not limited by the specific embodiments described herein, and various obvious changes, readjustments and substitutions can be made by those skilled in the art without departing from the scope of protection of the present disclosure. Therefore, although the present disclosure has been explained in more detail by means of the above embodiments, the present disclosure is not limited by the above embodiments, but may also include many other equivalent embodiments without departing from the inventive concept, and the scope of the present disclosure is determined by the scope of the appended claims.

What is claimed is:

1. A laser pulse sequence energy correction system, comprising a fundamental frequency light source, a control unit, an energy adjusting unit and a frequency multiplication crystal;
    the fundamental frequency light source is configured to output a fundamental frequency pulse laser, and the frequency multiplication crystal is configured to convert the fundamental frequency pulse laser into a multiple frequency pulse laser;
    the energy adjusting unit is located between the fundamental frequency light source and the frequency multiplication crystal;
    the control unit is connected to the energy adjusting unit, the control unit prestores an energy-time curve of the multiple frequency pulse laser, and the control unit is configured to control the energy adjusting unit to adjust an intensity of the fundamental frequency pulse laser incident on the frequency multiplication crystal according to the energy-time curve, so that an energy of each pulse in the multiple frequency pulse laser is identical; and
    the energy-time curve is obtained when the energy adjusting unit is not in operation.

2. The laser pulse sequence energy correction system according to claim 1, wherein, the energy correction system further comprises a light splitting unit, the light splitting unit is arranged at an emitting end of the frequency multiplication crystal, a first output end of the light splitting unit emits the multiple frequency pulse laser, and a second output end of the light splitting unit emits the fundamental frequency pulse laser.

3. The laser pulse sequence energy correction system according to claim 2, wherein, the light splitting unit comprises a light splitting mirror, the light splitting mirror is configured to transmit the multiple frequency pulse laser and reflect the fundamental frequency pulse laser, or the light splitting mirror is configured to reflect the multiple frequency pulse laser and transmit the fundamental frequency pulse laser.

4. The laser pulse sequence energy correction system according to claim 3, wherein, the light splitting mirror is a dichroic mirror.

5. The laser pulse sequence energy correction system according to claim 2, wherein, the energy correction system further comprises a fundamental frequency pulse laser absorption unit, the fundamental frequency pulse laser absorption unit is configured to absorb the fundamental frequency pulse laser output by the light splitting unit.

6. The laser pulse sequence energy correction system according to claim 3, wherein, the energy correction system further comprises a fundamental frequency pulse laser absorption unit, the fundamental frequency pulse laser absorption unit is configured to absorb the fundamental frequency pulse laser output by the light splitting unit.

7. The laser pulse sequence energy correction system according to claim 4, wherein, the energy correction system further comprises a fundamental frequency pulse laser absorption unit, the fundamental frequency pulse laser absorption unit is configured to absorb the fundamental frequency pulse laser output by the light splitting unit.

8. The laser pulse sequence energy correction system according to claim 1, wherein, pulse widths of the fundamental frequency pulse laser and the multiple frequency pulse laser are on an order of nanoseconds.

9. The laser pulse sequence energy correction system according to claim 8, wherein, the energy adjusting unit comprises a half wave plate and a rotating mechanism, and the rotating mechanism drives the half wave plate to rotate to adjust the intensity of the fundamental frequency pulse laser.

10. The laser pulse sequence energy correction system according to claim 1, wherein, pulse widths of the fundamental frequency pulse laser and the multiple frequency pulse laser are on an order of picoseconds.

11. The laser pulse sequence energy correction system according to claim 10, wherein, the energy adjusting unit comprises an acoustic-optic modulator or an acoustic-optic Q switch.

12. A laser pulse sequence energy correction method by using the laser pulse sequence energy correction system according to claim 1, wherein, the correction method comprises:

outputting a fundamental frequency pulse laser produced by a fundamental frequency light source to a frequency multiplication crystal, and acquiring output energy of the frequency multiplication crystal when an energy adjusting unit is not in operation, so as to obtain an energy-time curve of a multiple frequency pulse laser;

obtaining a time period T from the start of light emitting to time when frequency multiplication energy becomes stable according to the energy-time curve; and operating the energy adjusting unit between the fundamental frequency light source and the frequency multiplication crystal, and controlling, by a control unit, the energy adjusting unit to adjust the intensity of the fundamental frequency pulse laser incident on the frequency multiplication crystal in the time period T according to the energy-time curve, so as to enable energy of each pulse in the multiple frequency pulse laser to be identical.

\* \* \* \* \*